US006597336B1

(12) United States Patent
Hirakata et al.

(10) Patent No.: US 6,597,336 B1
(45) Date of Patent: *Jul. 22, 2003

(54) DISPLAY APPARATUS AND METHOD

(75) Inventors: Yoshiharu Hirakata, Kanagawa (JP);
Satoshi Teramoto, Kanagawa (JP); Jun Koyama, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/441,921

(22) Filed: Nov. 16, 1999

Related U.S. Application Data

(63) Continuation of application No. 08/730,411, filed on Oct. 15, 1996, now Pat. No. 5,986,630.

(30) Foreign Application Priority Data

Oct. 14, 1995 (JP) .............................. 7-291760
Oct. 15, 1995 (JP) .............................. 7-293741

(51) Int. Cl.$^7$ ................................. G09G 3/36
(52) U.S. Cl. ............................. 345/90; 345/76; 345/80; 345/87; 345/204; 345/205; 345/55; 348/513; 348/550; 348/792
(58) Field of Search ................. 345/55, 76, 80, 345/87, 90, 204, 205; 348/513, 550, 792

(56) References Cited

U.S. PATENT DOCUMENTS

| | | | | |
|---|---|---|---|---|
| 4,660,030 A | * | 4/1987 | Maezawa ..................... | 345/91 |
| 4,701,799 A | * | 10/1987 | Yoshimura .................. | 348/793 |
| 4,845,473 A | | 7/1989 | Matsuhashi et al. | |
| 5,040,874 A | * | 8/1991 | Fukuda ........................ | 345/87 |
| 5,048,949 A | | 9/1991 | Sato et al. ..................... | 353/77 |
| 5,057,928 A | * | 10/1991 | Nagashima et al. ........ | 348/793 |
| 5,243,413 A | | 9/1993 | Gitlin et al. | |
| 5,512,915 A | * | 4/1996 | Leroux ......................... | 345/55 |
| 5,754,160 A | * | 5/1998 | Shimizu et al. ............. | 345/103 |
| 5,986,630 A | * | 11/1999 | Hirakata et al. ............ | 345/100 |
| 6,229,531 B1 | * | 5/2001 | Nakajima et al. ........... | 345/205 |

FOREIGN PATENT DOCUMENTS

| | | |
|---|---|---|
| EP | 0 373 897 A2 | 6/1990 |
| EP | 0 586 198 A1 | 3/1994 |
| JP | 52-24493 | 2/1977 |
| JP | 63-168690 | 7/1988 |
| JP | 2-157813 | 6/1990 |
| JP | 2-157 813 | 6/1990 |
| JP | 03-048816 | 3/1991 |
| JP | 3-132789 | 6/1991 |
| JP | 4-207678 | 7/1992 |
| JP | 04-253088 | 9/1992 |
| JP | 5-19242 | 1/1993 |
| JP | 5-94152 | 4/1993 |
| JP | 05-323270 | 12/1993 |
| JP | 05-344521 | 12/1993 |
| JP | 06-225303 | 8/1994 |
| JP | 06-342140 | 12/1994 |
| JP | 07-044136 | 2/1995 |
| JP | 07-325214 | 12/1995 |
| JP | 08-137439 | 5/1996 |

* cited by examiner

*Primary Examiner*—Bipin Shalwala
*Assistant Examiner*—Vincent E. Kovalick
(74) *Attorney, Agent, or Firm*—Fish & Richardson P

(57) ABSTRACT

Writing of a second field is started at a time point when writing of a first field has been completed, while information written in the first field is held. Writing of a first field of the next frame is started at a time point when the writing of the second field has been completed, while information written in the second field is held. This driving method can attain high vertical resolution.

32 Claims, 10 Drawing Sheets

DISPLAY APPARATUS AND METHOD

This is a continuation of U.S. application Ser. No. 08/730,411, filed Oct. 15, 1996, now U.S. Pat. No. 5,986,630.

BACKGROUND OF THE INVENTION

1. Field of the Invention

The present invention relates to active matrix display apparatuses typified by an active matrix liquid crystal display apparatus, and to a related display method.

2. Description of Related Art

In a conventional active matrix display apparatus, switching thin-film transistors or nonlinear elements, which are provided for respective pixels that are arranged in matrix form, control charges entering or exiting from pixel electrodes.

The active matrix liquid crystal display apparatus generally employs a display method in which one frame is divided into a first field and a second field. FIG. 1A shows a timing chart of this method. First, information is written to rows of pixels that are arranged in the form of an m-row/n-column matrix as shown in FIG. 7, and the written information is displayed as a first field. Then, next information is written again to same rows of the pixels and the written information is displayed as a second field. The first and second fields thus formed constitute one frame.

More specifically, in the matrix region of FIG. 7, information is sequentially written to first-row pixels (1, 1), (2, 1), (3, 1), . . . , then to second-row pixels (1, 2), (2, 2), (3, 2), . . . , and so forth to form a first field. Next, following information is sequentially written again to first-row pixels (1, 1), (2, 1), (3, 1), . . . , then to second-row pixels (1, 2), (2, 2), (3, 2), . . . , and so forth to form a second field. One frame is formed when information writing to all pixels two times has been completed. Display continues as frames are formed 30 times per second.

One reason or employing the above display method is to make a flicker, which is likely to occur with a bright picture, less recognizable. A flicker is more easily recognized when the vertical scanning period is longer. Therefore, a flicker can be made less recognizable by halving the apparent vertical scanning period by constituting one frame of two fields.

Another reason for employing the above display method is to reduce the amount of information necessary for one frame.

However, the above display method has a problem of decrease in vertical resolution because the number of scanning lines is substantially reduced to n/2.

In particular, in a large-screen projection type display method as employed in a projector, non-display fields are recognized by a viewer This is a major factor of decreasing the vertical resolution.

SUMMARY OF THE INVENTION

An object of the present invention is to provide a display apparatus and method in which the vertical resolution does not decrease even with the above-described scanning method.

According to one aspect of the invention, there is provided a display method in which information is written to a matrix-like pixel region, comprising the steps of:

writing information to odd rows in a first field;

writing information to even rows in a second field, starting at a time point when the writing of the first field has been completed; and holding the information written in the first field until completion of the writing of the second field.

In this display method, as shown in FIG. 1B, a first field is formed by writing information to Nth rows where N represent odd rows 1, 3, 5, . . . and a second field is formed by writing information to (N+1)th rows. The first and second fields are related to each other such that the writing of the second field is started at a time point when the writing of the first field has been completed, while information written in the first field is held until completion of the writing of the second field.

Further, a first field of the next frame is started at a time point when the writing of the second field has completed, while information written in the second field is held. By repeating this operation, high resolution can be attained in the vertical scanning direction.

According to another aspect of the invention, there is provided a display method in which information is written to a matrix-like pixel region, comprising the steps of:

writing information to Nth rows in a first field, where N represents odd or even numbers;

writing information to (N+1)th rows in a second field, starting at a time point when the writing of the first field has been completed; and holding the information written in the first field until completion of the writing of the second field.

The invention can be applied to three-dimensional display, time-divisional display of different images, and other types of display in addition to ordinary two-dimensional display. The matrix-like structure includes a matrix circuit of an active matrix liquid crystal display apparatus and a matrix circuit of a display apparatus using an EL device.

According to a further aspect of the invention, there is provided a display apparatus comprising:

means for projecting two divisional images onto a projection surface so that the two divisional images are superimposed on each other, an image formed on the projection surface being constituted of pixels that are arranged in matrix form;

means for forming Nth rows on the projection surface by using one of the two divisional images, where N represent odd numbers 1, 3, 5, . . . , and means for forming (N+1)th rows on the projection surface by using the other divisional image.

FIGS. 5A to 5C show a specific example of this display apparatus. In this display apparatus, six images formed by six respective active matrix regions shown in FIG. 6 are grouped into two images, which are projected onto a screen 510 through an optical system 508 so as to be superimposed on each other.

The display apparatus of FIGS. 5A to 5C has an integrated liquid crystal panel 507 shown in FIG. 6. For example, in the integrated liquid crystal panel 507, active matrix regions 701 to 703 form the Nth rows as mentioned above and active matrix regions 704 to 706 form the (N+1)th rows.

According to another aspect of the invention, there is provided a display apparatus for performing display in which one frame consists of a first field and a second field, comprising:

image forming means for forming the first field; and image forming means for forming the second field.

The operation of this display apparatus is specifically illustrated in FIG. 1B. As shown in FIG. 1B, active matrix regions 701 to 703 (see FIG. 6) form a first field and active matrix regions 704 to 706 form a second field.

In particular, as shown in FIG. 1B, at a time point when information is written (i.e., an image is displayed) by one of the image forming means in a period of the first field. Upon completion of this information writing, image formation of the second field by the other image forming means is started. The image of the first field is maintained during the writing of the second field. As a result, the apparent vertical resolution can be kept high.

According to another aspect of the invention, there is provided a display method in which information is written to respective pixels of a displayed image that are arranged in matrix form, comprising the steps of:

projecting two divisional images onto a projection surface so that the two divisional images are combined on the projection surface;

forming Nth rows on the projection surface by using one of the two divisional images, where N represent odd numbers 1, 3, 5, . . . ; and forming (N+1)th rows on the projection surface by using the other divisional image.

According to still another aspect of the invention, there is provided a display method in which one frame consists of a first field and a second field, wherein the first field and the second field are formed by separate image forming devices.

In operation, as shown in FIG. 1B, a first field for scanning of odd fields and a second field for scanning of even rows are related to each other such that even if writing of the first field is finished, a state at a time point of completion of the writing of the first field is maintained (i.e., information written in the first field is maintained) until completion of writing of the second field. Writing of a first field of the next frame is started upon completion of the writing of the second field.

By virtue of coexistence of information written in the first field; and information written in the second field, the number of apparent scanning lines can be doubled as compared to the conventional method, that is, the vertical resolution can be kept high.

BRIEF DESCRIPTION OF THE DRAWINGS

Figure 7:
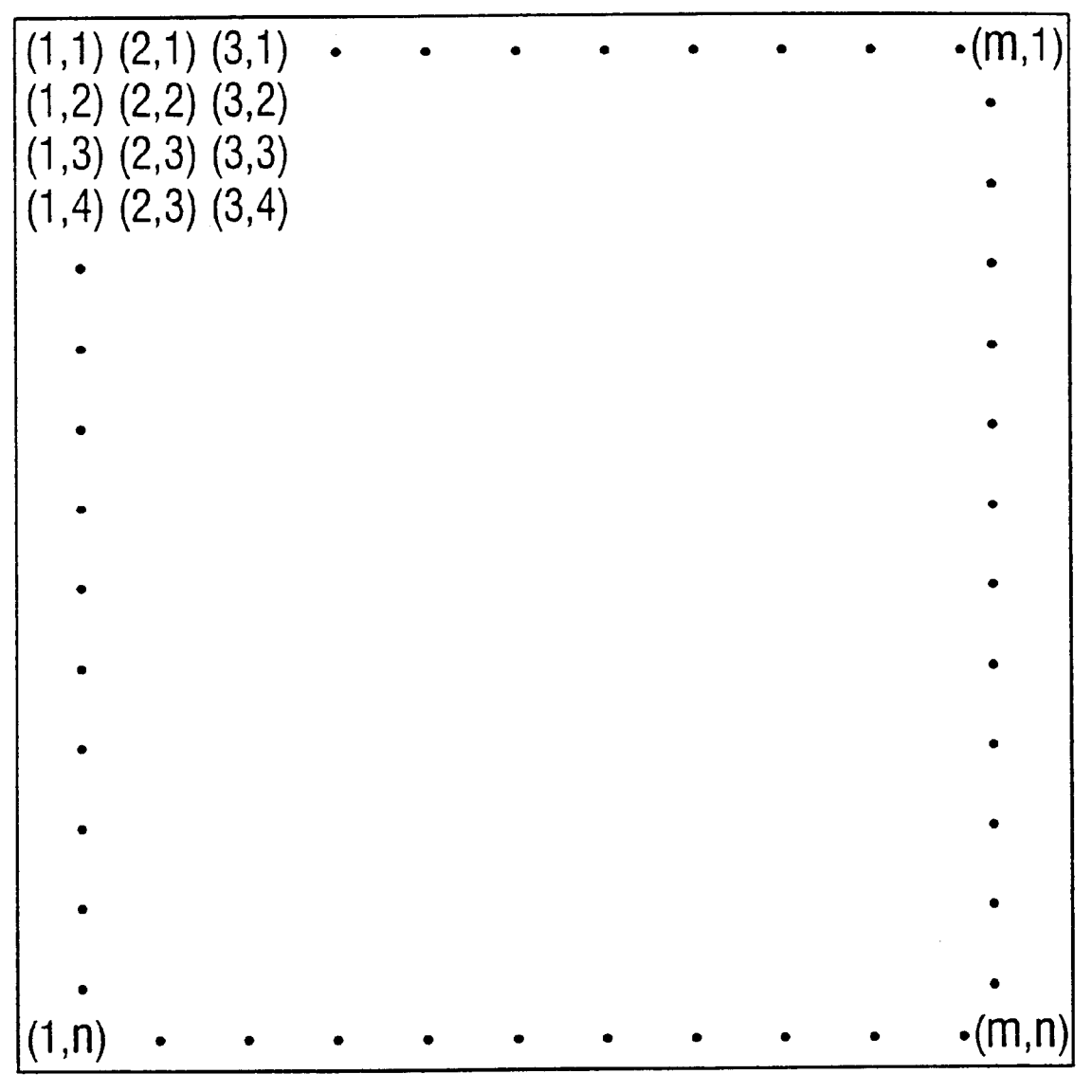

FIG. 7 shows a general arrangement of pixels in a matrix region.

DETAILED DESCRIPTION OF THE PREFERRED EMBODIMENTS

Embodiment 1

Figure 1:
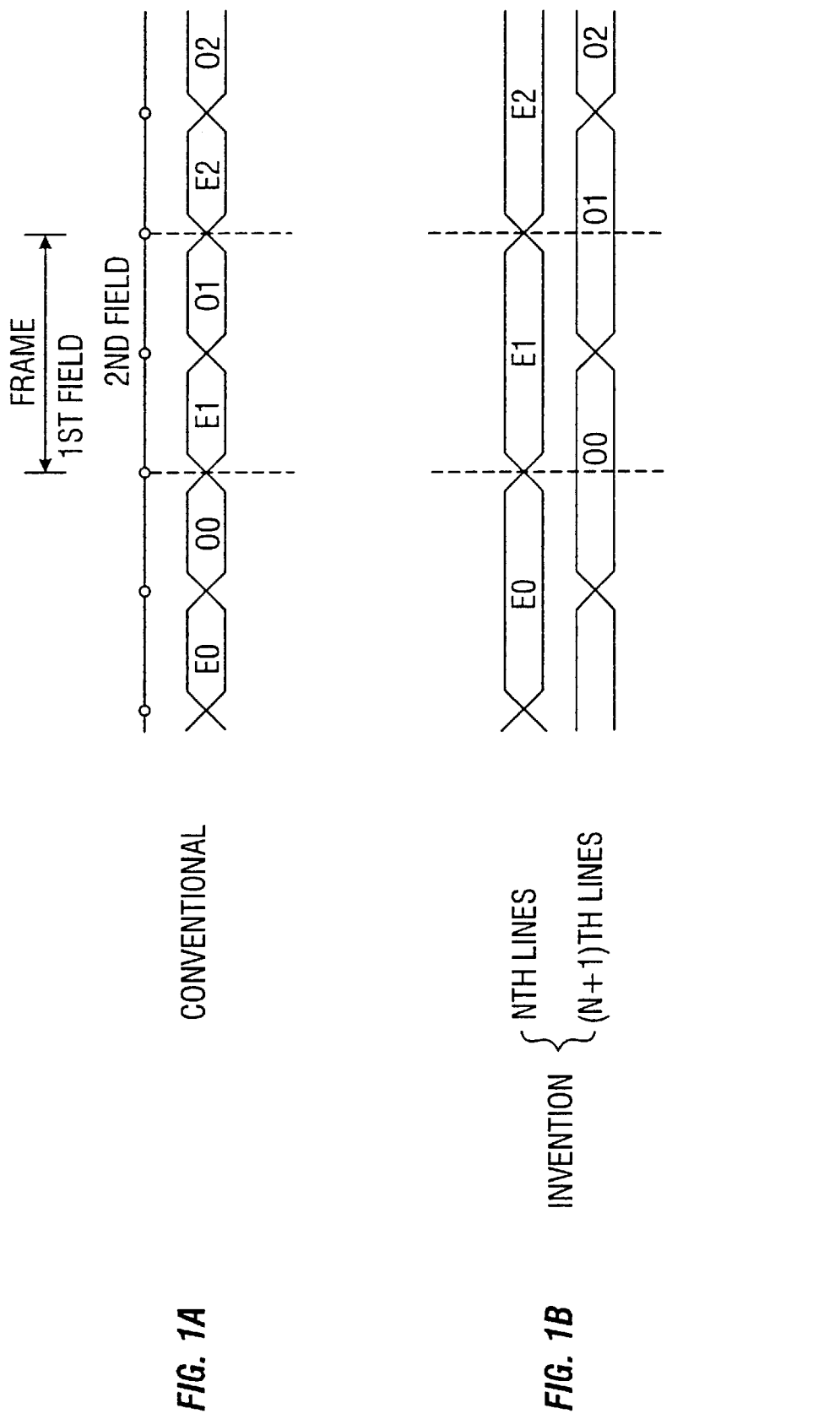
FIGS. 1A and 1B are display timing charts.
Figure 2:
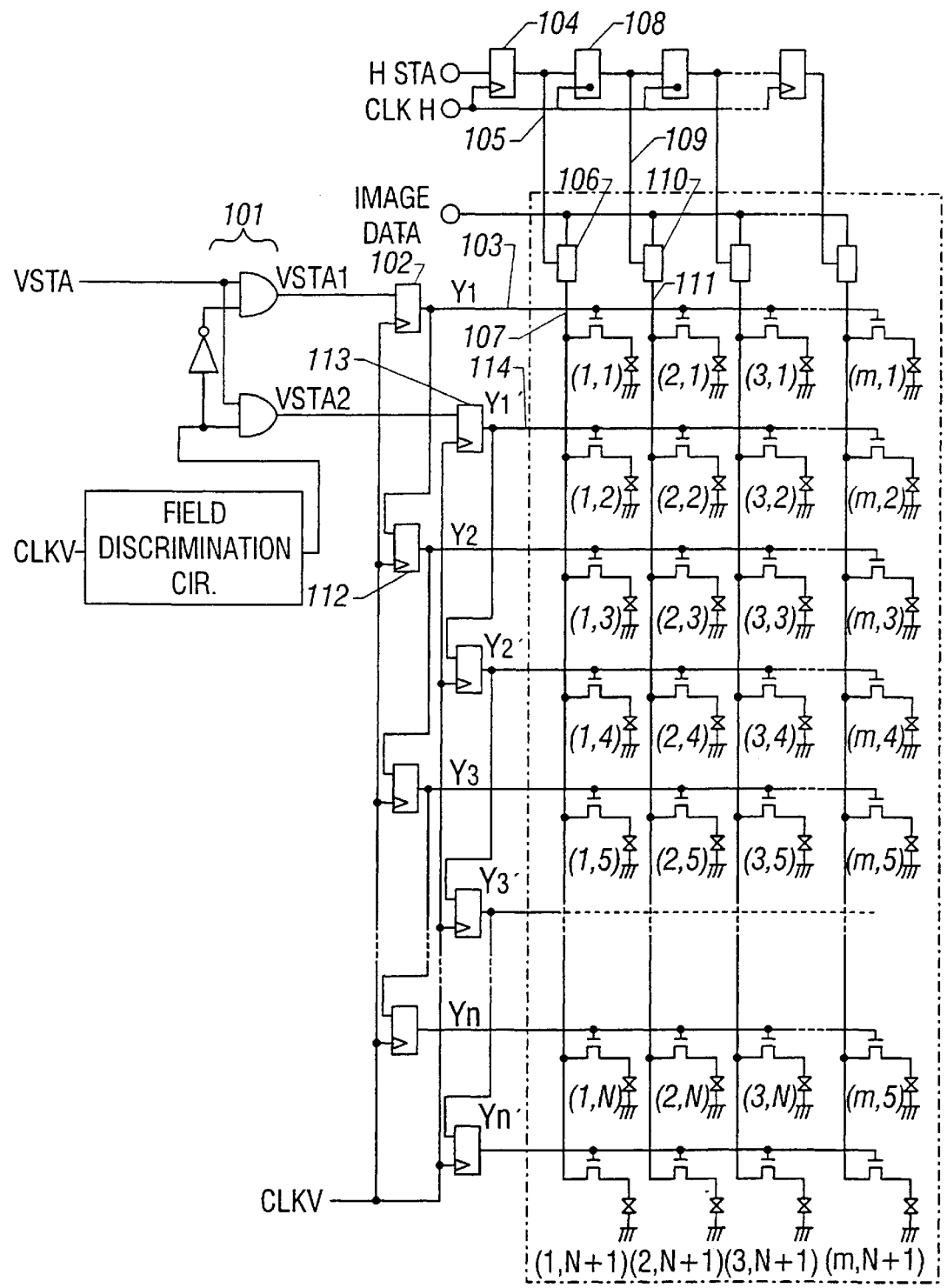
FIG. 2 shows a circuit configuration of a liquid crystal display apparatus according to a first embodiment of the present invention.

FIG. 2 shows a circuit configuration of a liquid crystal display apparatus according to this embodiment. This circuit operates according to a timing chart shown in FIG. 3, to thereby effect display shown in FIG. 1B.

In FIG. 2, a flip-flop circuit 102 has a function of stably maintaining one of two states. For example, when the flip-flop circuit 102 receives a rising edge of an operation clock signal in a state that the input level is H, the output level turns to H. On the other hand, when it receives a rising edge of the operation clock signal in a state that the input level is L, the output level turns to L. These states are maintained until it receives the next rising edge of the operation clock signal.

In the circuit of FIG. 2, signal VSTA (vertical scanning timing enable signal) is selected by a selection circuit 101 as VSTA1. In this state, an H-level signal (high in terms of logical level) is being applied to: the input of the flip-flop circuit 102.

When a rising edge of signal CLKV (operation clock signal of a vertical scanning control circuit) is input to flip-flop circuit 102 in this state, the flip-flop circuit output the VSTA data of the moment and hence the signal level of a gate line 103 turns to an H level. (We define it as VSTA is "punched out" by CLKV.) That is, when a rising edge of CLKV is input to the flip-flop circuit 102 in a state that its input is at an H level, the output of the flip-flop circuit 102 turns to an H level. When the signal level of the gate signal line 103 turns to an H level, thin-film transistors located at respective pixels of row $Y_1$ having addresses (1, 1). (2, 1), (3, 1), . . . are turned on.

In this state, at a flip-flop circuit 104, signal HSTA (horizontal scanning timing enable signal) is "punched out" by a rising edge of signal CLKH (operation clock signal of a horizontal scanning control circuit), whereby the signal level of an image sampling signal line 105 turns to H.

As a result, image data is taken by a sampling hold circuit 106 sand then flows into an image signal line 107. Since in this state all the thin-film transistors of row $Y_1$ of addresses (1, 1), (2, 1), (3, 1), . . . are on, the image data is written to the pixel of address (1, 1).

Then, the next rising edge of CLKH causes the output of a flip-flop circuit 108 to turn to an H level and makes the output of the flip-flop circuit 104 turn to a L level. That is, when a rising edge of CLKH is input to the flip-flop circuit 108 in a state that its input (i.e., output of the flip-flop circuit 104) is at an H level, the output of the flip-flop circuit 108 turns to an H level. At the same time, the output of the flip-flop circuit 104 turns to a L-level.

As a result, the signal level of an image sampling signal line, 109 turns to an H level. Image data is taken through a sampling hold circuit 110 and then supplied to an image signal line 111.

As a result, information is written to the pixel of address (2, 1). In this manner information is sequentially written to the pixels of addresses (1, 1) to (m, 1), i.e., the pixels of row $Y_1$ (first row).

Upon completion of the information writing to row $Y_1$, the next rising edge of CLKV causes the output of the flip-flop circuit 102 to turn to a L level and makes the output of the flip-flop circuit 112 turn to an H level. As a result, information is sequentially written to the respective pixels of row $Y_2$, i.e., the pixels of addresses (1, 3), (2, 3), (3, 3), . . . .

Upon completion of the information writing to row $Y_2$ (third line), information writing to rows $Y_3$ and $Y_4$ is sequentially effected as similar operations are performed. Information writing of the first field proceeds in this manner.

Figure 3:
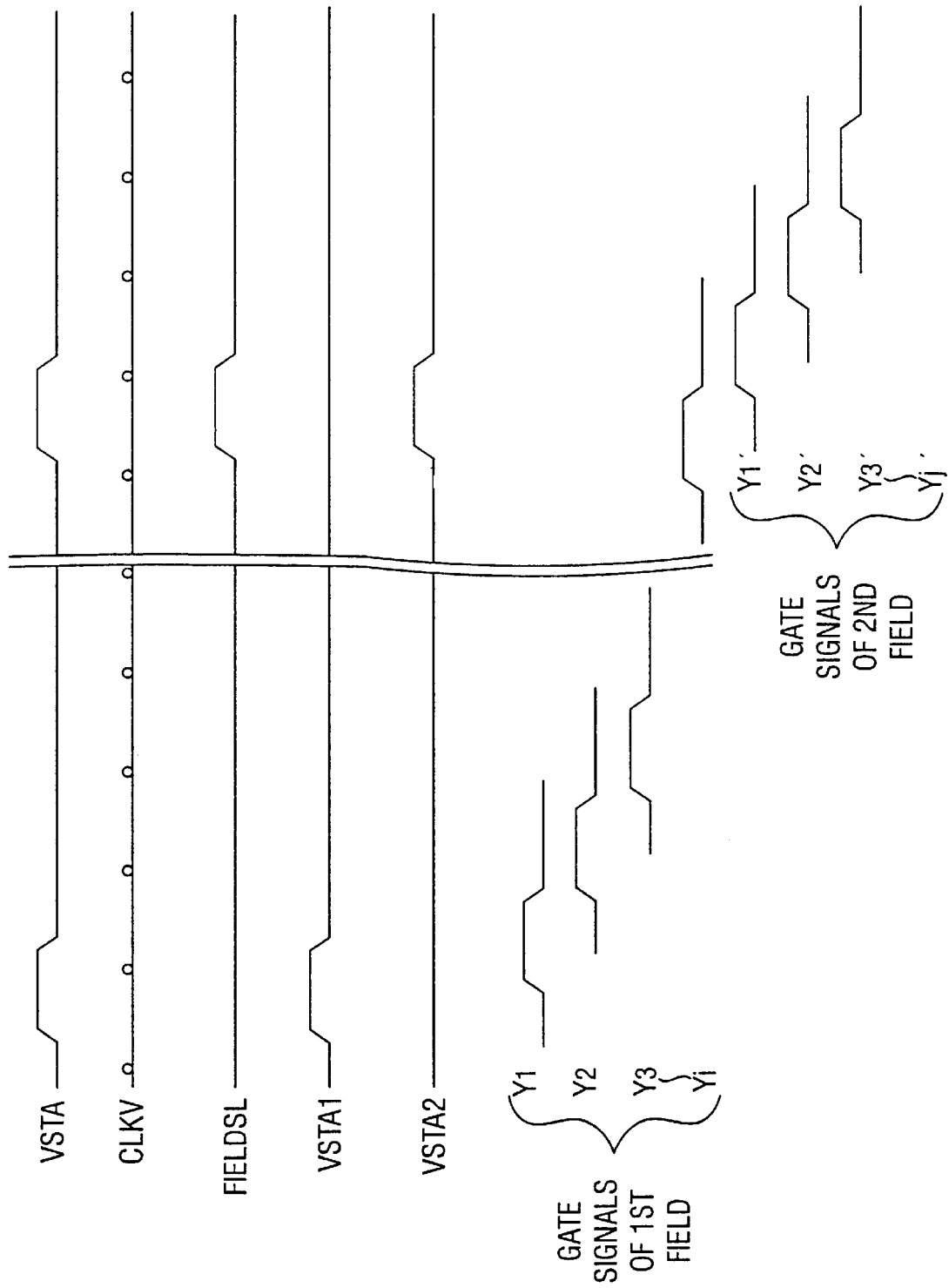
FIG. 3 is a timing chart showing the operation of a display apparatus according to a first embodiment of the present invention.

Upon completion of the writing of the first field, the next H level signal of VSTA is selected as VSTA2 by the selection circuit 101, as shown in FIG. 3.

VSTA2 is "punched out" by a rising edge of CLKV that is input to a flip-flop circuit 113, so that the signal level of a gate signal line 114 turns to an H level.

As a result, information writing to the pixels of row $Y_1'$ is sequentially performed. Subsequently, information writing is sequentially performed on even rows $Y_2'$, $Y_3'$... That is, information writing to rows $Y_n'$ is performed in the second field.

During the information writing to rows $Y_1'$, the information that: has been written in the first field is maintained as it is. That is, the display by rows $Y_n$ is maintained as it is.

Upon completion of the writing of the second field, writing of the first field of the next frame is started. During the writing of the ırst field, the information that has been written in the second field of the previous frame is maintained as it is.

In this manner, the first fields and the second fields are alternately displayed while being overlapped with each other by their half duration. With this operation, the number of vertical scanning lines is made n lines apparently; that is, high vertical resolution can be attained.

Embodiment 2

Figure 4A:
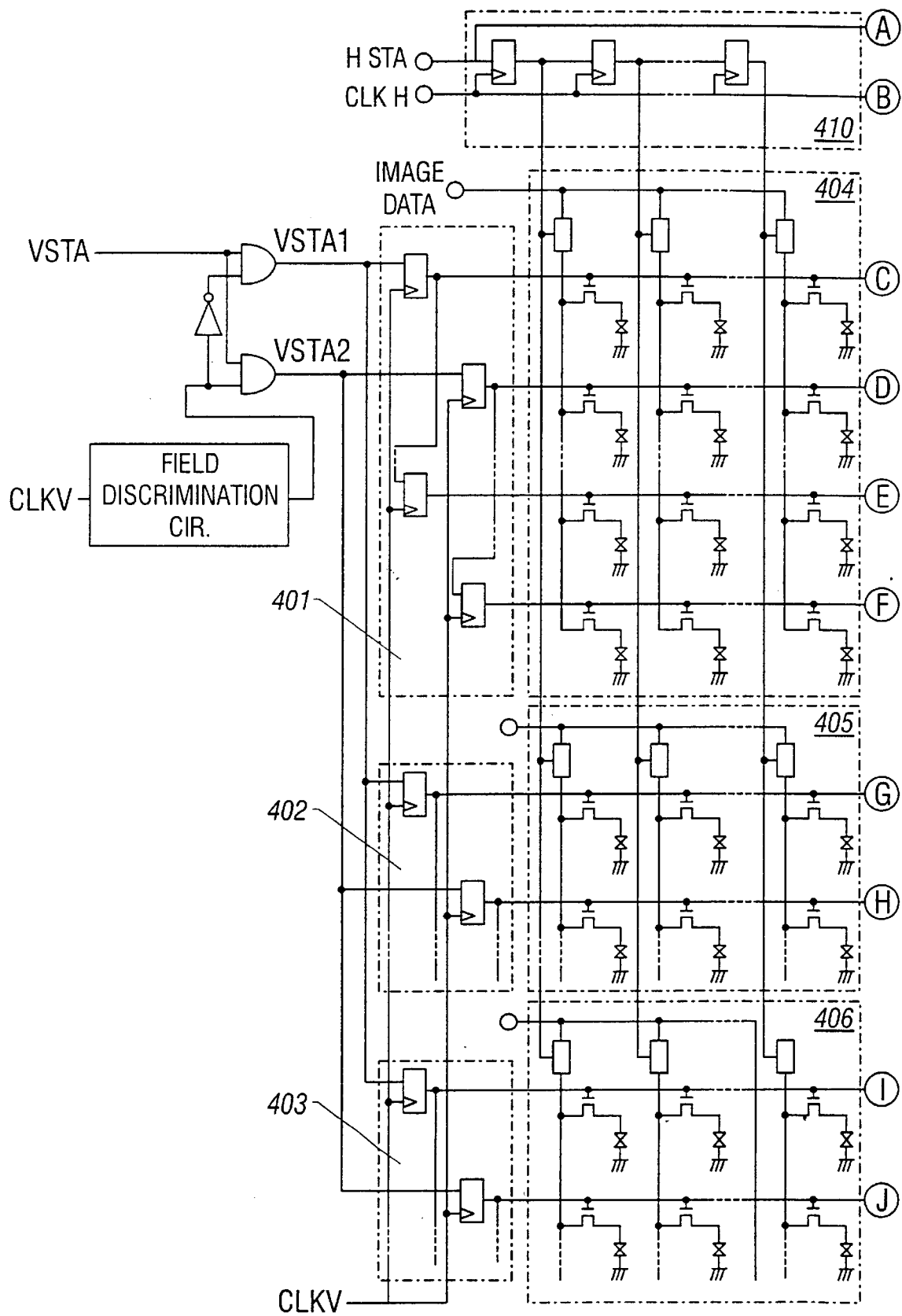
FIG. 4 shows the configuration of a liquid crystal panel according to a second embodiment of the invention.
Figure 4B:
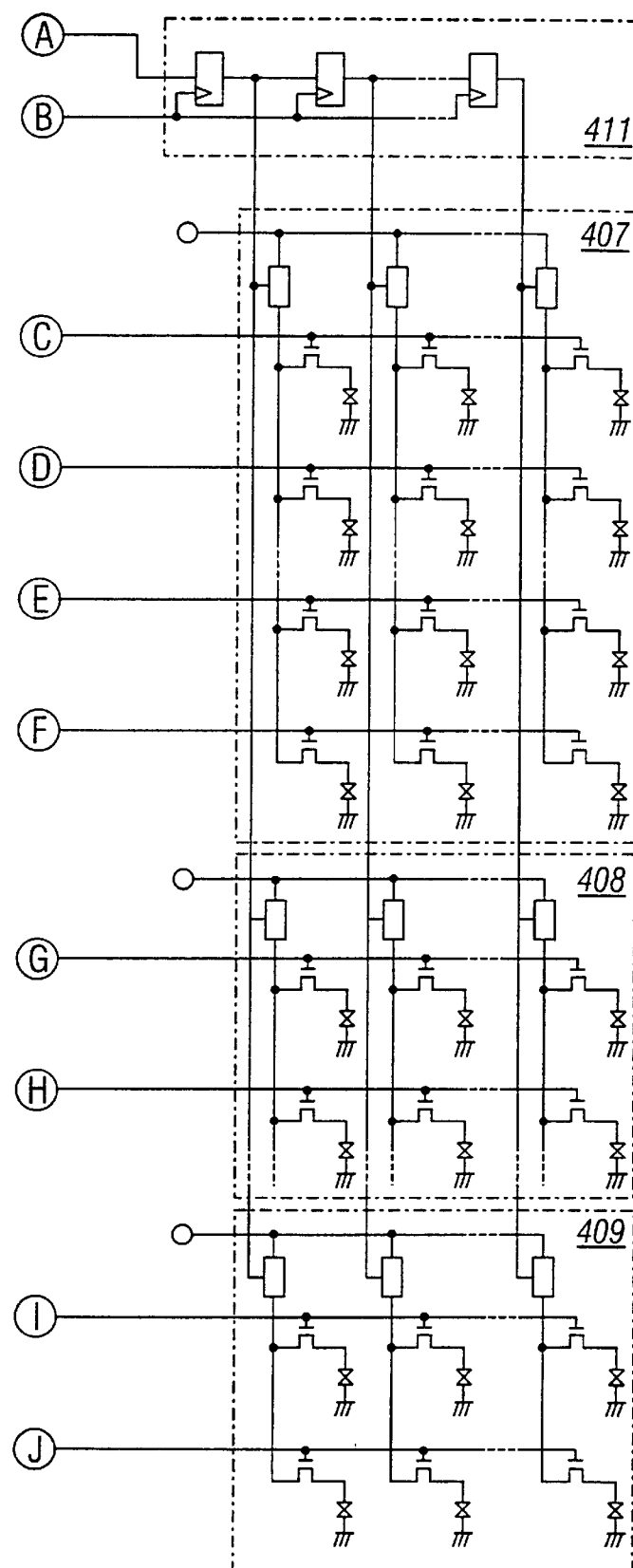

This embodiment is directed to a configuration in which six active matrix regions 404 to 409 are integrated as shown in FIG. 4. This configuration is characterized in that a plurality of active matrix regions are integrated on the same substrate, and that peripheral circuits for commonly performing horizontal and/or vertical scanning control, of those active matrix regions are also integrated on the above substrate. In the configuration of FIG. 4, the substrate is a glass or quartz substrate.

In the configuration of FIG. 4, a vertical scanning control circuit 401 controls vertical scanning of the active matrix regions 404 and 407. A vertical scanning control circuit 402 controls vertical scanning of the active matrix regions 405 and 408. A vertical scanning control circuit 403 controls vertical scanning of the active matrix regions 406 and 409.

A horizontal scanning control circuit 410 controls horizontal scanning of the active matrix regions 404 to 406. A horizontal scanning control circuit 411 controls horizontal scanning of the active matrix regions. 407 to 409.

The respective active matrix regions 404 to 409 operate in the same manner as the active matrix region of the first embodiment. In the configuration of FIG. 4, all the active matrix regions 404 to 409 operate so as to be timed to each other.

For example, the configuration of FIG. 4 is such that the active matrix regions 404 to 406 form a color image (R, G and B images) and similarly the active matrix regions 407 to 409 form a color image (R, G and B images), and that those images are projected so as to be superimposed each other by use of a proper optical system. This configuration enables display of a bright image.

While the example of FIG. 4 is directed to the case where six active matrix regions are integrated, active matrix regions may be integrated in other matrices such as 2×1, 3×3, and 4×2. In general, where the number of active matrices is M×N, it suffices that the sum of the number of horizontal scanning control circuits needed and the number of vertical scanning control circuits needed be M+N. This type of configuration, together with the implementation that the circuits are integrated on the same substrate, provides advantages of decrease in manufacturing cost and improvement in reliability.

Embodiment 3

Figure 5A:
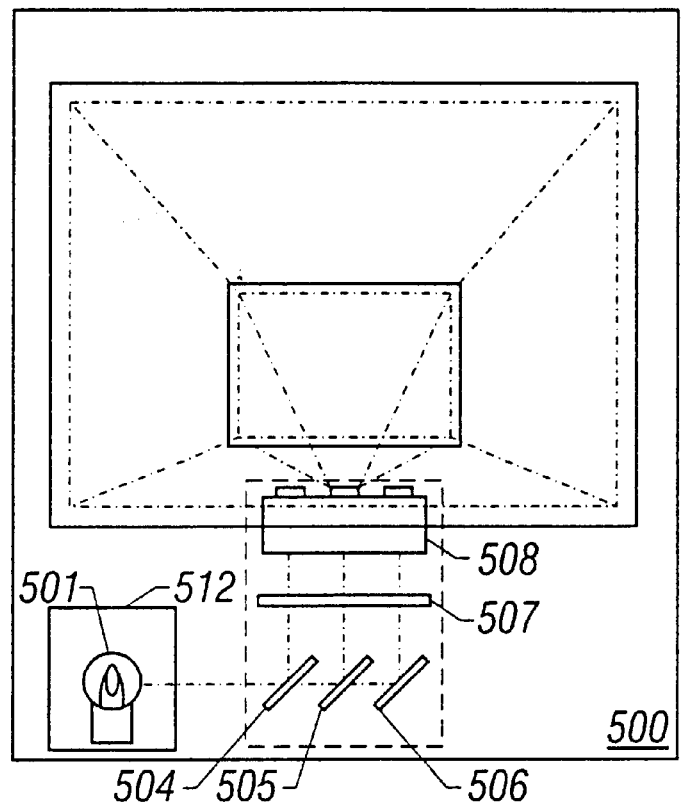
FIGS. 5A to 5C show a projection-type display apparatus according to a third embodiment of the invention which uses the liquid crystal panel of FIG. 4.
Figure 5B:
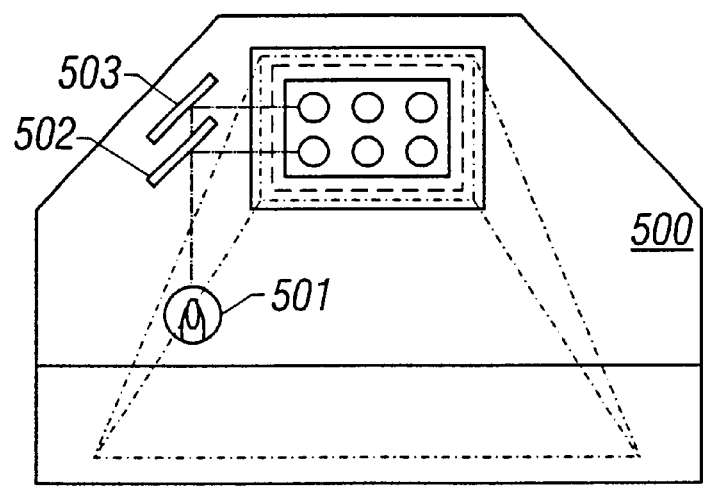
Figure 5C:
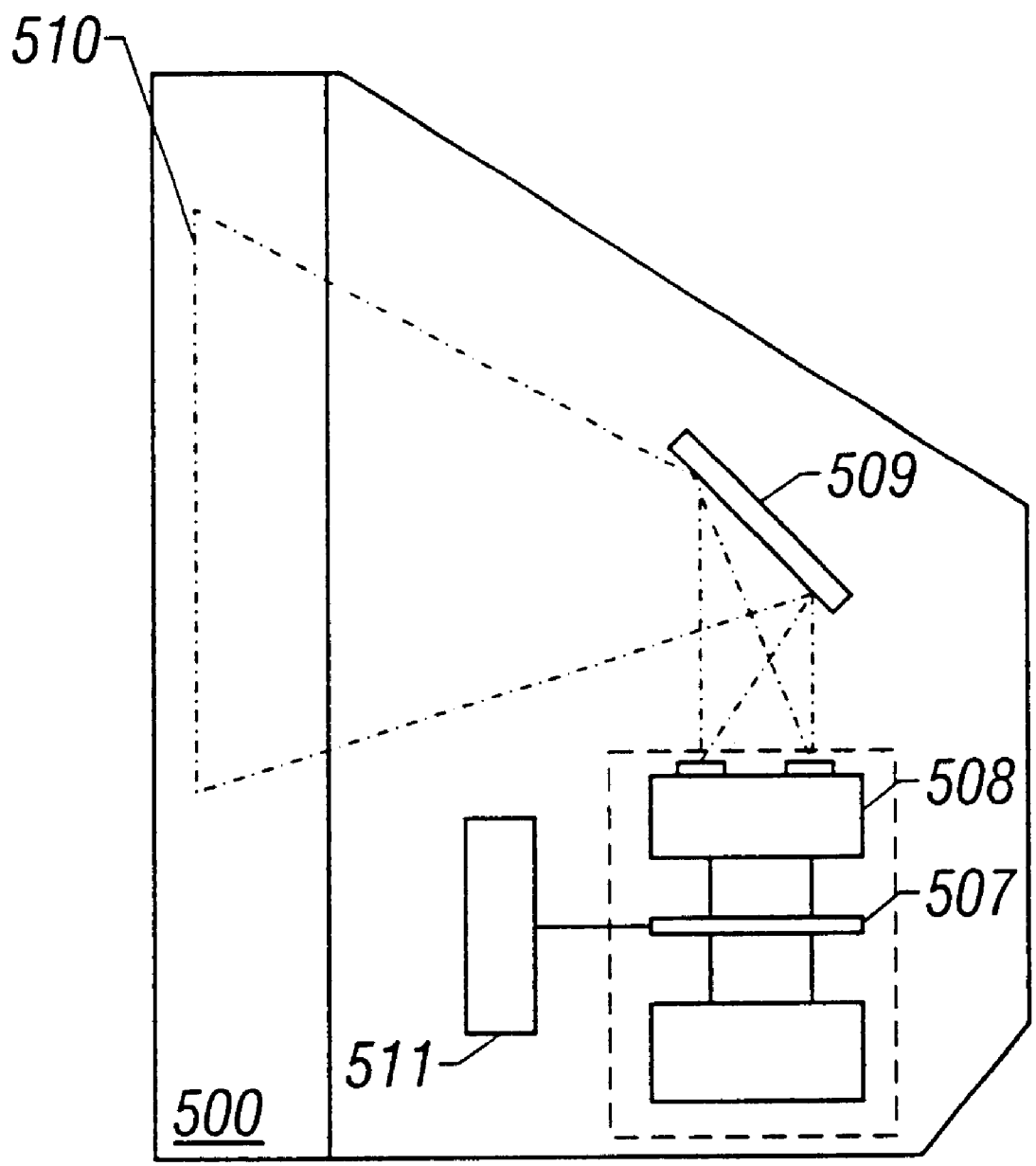

This embodiment is directed to a projection-type display apparatus which uses the integrated liquid crystal panel of FIG. 4. FIGS. 5A to 5C show a configuration of a projection-type display apparatus according to this embodiment. In FIGS. 5A to 5C, an image is enlarged and projected from the inside of a body 500 onto a screen 510 that is attached to the body 500.

This embodiment relates to a projection scheme in which an image is viewed from the side of the screen 510 opposite to the projection side (generally called a rear projection type). The basic configuration remains the same even in another projection scheme in which an image is viewed from the same side of the screen as the projection side (generally called a front projection type) except that an image is inverted and that the body and the screen are not united in one device.

In this embodiment, a proper control circuit 511 is accommodated in the body 500 to perform image display control, selection between a two-dimensional image and a three-dimensional image, and other control operations.

In FIGS. 5A to 5C, white light emitted from a light source 501 is reflected by a half mirror 502, and then separated into light beams in wavelength ranges corresponding to R (red), G (green), and B (blue) by dichroic mirrors 504 to 506.

Light reflected by a mirror 503 is also separated into light beams in wavelength ranges corresponding to R, G and B by dichroic mirrors. That is, two sets of R, G and B light beams (six light beams in total) are generated by the two sets of dichroic mirrors for R, G and B.

The resulting light beams are input to an integrated liquid crystal panel 507 whose configuration is shown in FIG. 4. Two RGB images formed through optical modulation by the integrated liquid crystal panel 507 are projected from an optical system 508 onto a screen (projection surface) 510 via a mirror 509, and combined into a color image on the screen 510.

The optical system 508 incorporates a lens system for enlarged projection and a polarization adding means (usually a polarizing plate) that is used in effecting three-dimensional display. In the case of ordinary two-dimensional display, the polarization adding means merely acts as a light attenuating means, and hence causes any problems except for reduction in brightness of display. However, if it is necessary to prevent brightness reduction in the case of two-dimensional display, the apparatus may be so constructed that the polarization adding means can be removed from the optical path mechanically.

As such, the display apparatus according to this embodiment can attain display of a bright image having high resolution.

Embodiment 4

Figure 6A:
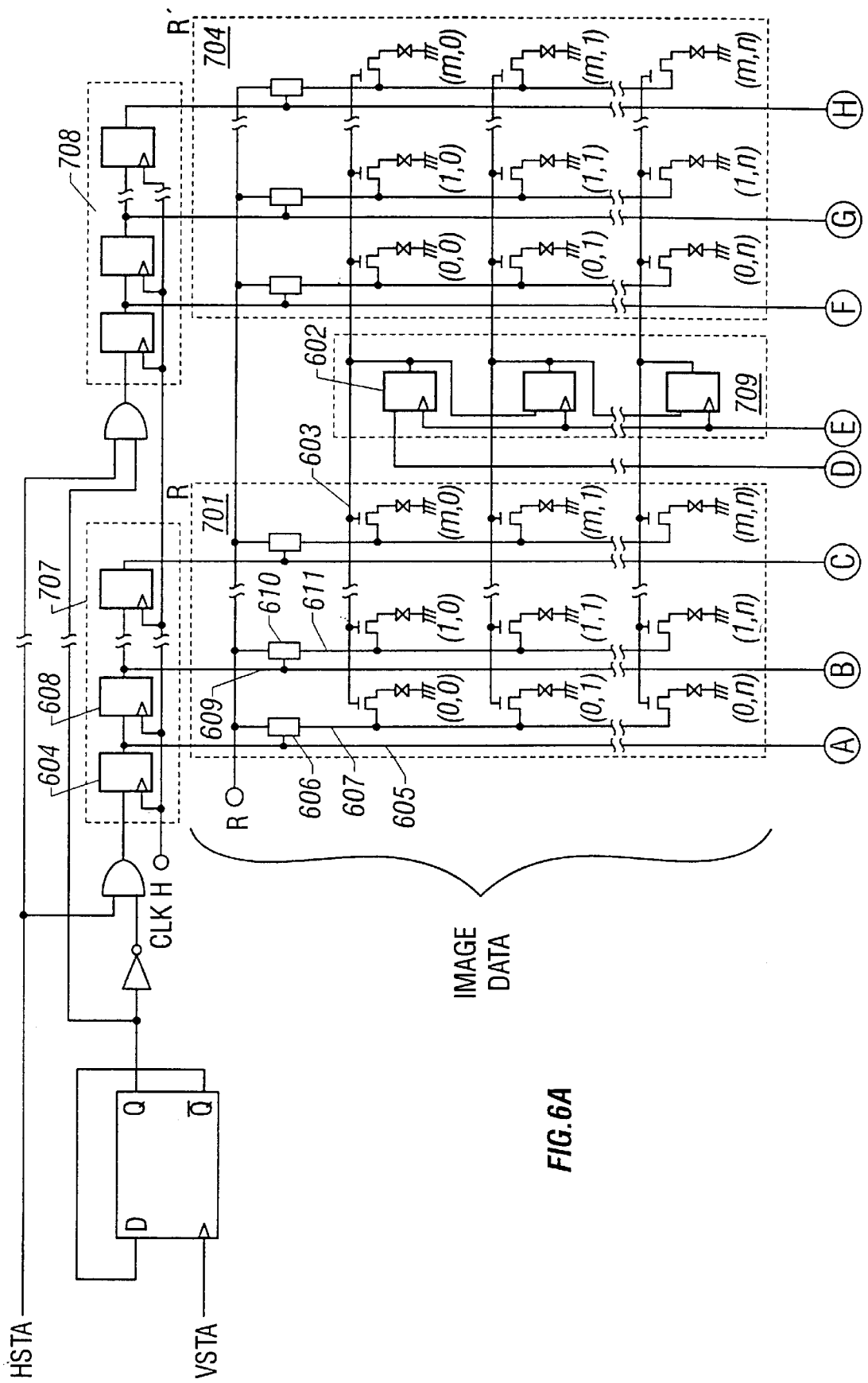
FIG. 6 shows the configuration of an integrated liquid crystal panel according to a fourth embodiment of the invention.
Figure 6B:
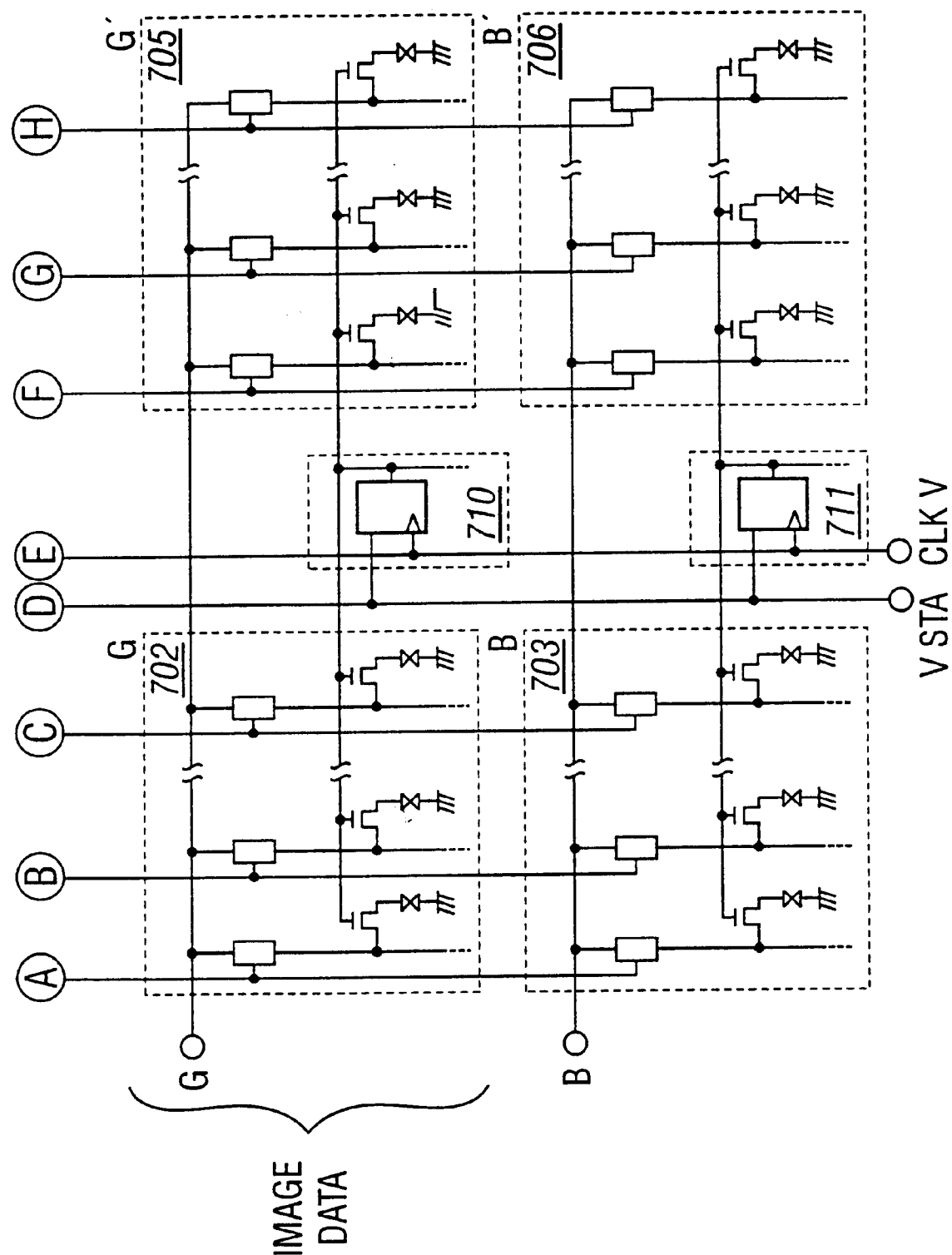

FIG. 6 shows the configuration of an integrated liquid crystal panel used in this embodiment. In this configuration, active matrix regions 701 to 703 form a first RGB image and active matrix regions 704 to 706 form a second RGB image.

The horizontal scanning of the active matrix regions 701 to 703 is controlled by a horizontal scanning control circuit 707 that is common to those matrix regions. The horizontal scanning of the active matrix regions 704 to 706 is controlled by a horizontal scanning control circuit 708 that is common to those matrix regions.

The operation timing of the horizontal scanning control circuits 707 and 708 is controlled in accordance with the vertical scanning timing so that the horizontal scanning control circuits 707 and 708 serves to form a first-field image and a second-field image, respectively. That is, the active matrix regions 701 to 703 form a first-field image and the active matrix regions 704 to 706 form a second-field image (see FIG. 1B). The first and second fields together constitute one frame.

The active matrix regions 701 and 704 are commonly controlled by a vertical scanning control circuit 709. The active matrix regions 702 and 705 are commonly controlled by a vertical scanning control circuit 710. The active matrix regions 703 and 706 are commonly controlled by a vertical scanning control circuit 711.

According to this configuration, the liquid crystal panel is simplified in structure, so that its manufacturing cost can be reduced and it can be improved in reliability.

In FIG. 6, a flip-flop circuit 602 has a function of stably maintaining one of two states. For example, when the flip-flop circuit 602 receives a rising edge of an operation clock signal in a state that the input level is H, the output level turns to H. On the other hand, when it receives a rising edge of the operation clock signal in a state that the input level is L, the output level turns to L. These states are maintained until it receives the next rising edge of the operation clock signal.

In the circuit of FIG. 6, an H-level signal of signal VSTA (vertical scanning timing enable signal) is applied to the input of the flip-flop circuit 602. In this state, a rising edge of signal CLKV (operation clock signal of vertical scanning control circuits) is input to the flip-flop circuit 602.

As a result, at the flip-flop circuit 602, VSTA is "punched out" by CLKV and hence the signal level of a gate line 603 turns to an H level. That is, when a rising edge of CLKV is input to the flip-flop circuit 602 in a state that its input is at an H level, the output of the flip-flop circuit 602 turns to an H level. When the signal level of the gate signal line 603 turns to an H level, thin-film transistors located at respective pixels having addresses (0, 0), (1, 0), (2, 0), . . . , (m, 0) are turned on.

In this state, at a flip-flop circuit 604, signal HSTA (horizontal scanning timing enable signal) is "punched out" by a rising edge of signal CLKH (operation clock signal of horizontal scanning control circuits), whereby the signal level of an image sampling signal line 605 turns to H.

As a result, image data is taken through a sampling hold circuit 606 and then flows into an image signal line 607. Since in this state all the thin-film transistors of the row of addresses (0, 0), (1, 0), . . . , (m, 0) are on, the image data is written to the pixel of address (0, 0).

Then, the next rising edge of CLKH causes the output of a flip-flop circuit 608 to turn to an H level and makes the output of the flip-flop circuit 604 turn to a L level. That is, when a rising edge of CLKH is input to the flip-flop circuit 608 in a state that its input (i.e., output of the flip-flop circuit 604) is at an H level, the output of the flip-flop circuit 608 turns to an H level. At the same time, the output of the flip-flop circuit 604 turns to a L-level.

As a result, the signal level of an image sampling signal line 609 turns to an H level. Image data is taken through a sampling hold circuit 610 and then supplied to an image signal line 611.

As a result information is written to the pixel of address (1, 0). In this manner, information is sequentially written to the pixels of addresses (0, 0) to (m, 0), i.e., the pixels of the first row.

Thereafter, the output of the next flip-flop circuit of the vertical scanning control circuit 709 turns to an H level, and information is written to the pixels of addresses (0, 1), (1, 1), . . . , (m, 0). The writing of one-field information is completed when information writing to the pixel of address (m, n) is finished.

During the above operation, a horizontal scanning control circuit 708 does not operate because signal HSTA is not input thereto. Therefore, the above operation is performed in the active matrix regions 701 to 703 in similar manners.

Upon completion of image writing to all the pixels of the active matrix regions 701 to 703, signal HSTA is applied to the horizontal scanning control circuit 708 timed to signal VSTA (vertical scanning timing enable signal). As a result, information is written to the first row of the active matrix regions 704 to 706.

All pixels of the active matrix regions 704 to 706 are sequentially subjected to this information writing. Thus, the information writing of the second field is completed.

In this manner, the information writing of the first RGB field and that of the second RGB field are performed alternately. During information writing of one of the first and second fields, information written in the other field is held. Therefore, the display proceeds according to the operation timing shown in FIG. 1B.

According to this embodiment, high vertical resolution can be attained because the number of scanning lines in the vertical direction is not reduced.

While the example of FIG. 6 is directed to the case where six active matrix regions are integrated, active matrix regions may be integrated in other matrices such as 2×1, 3×3, and 4×2. In general, where the number of active matrices is M×N, it suffices that the sum of the number of horizontal scanning control circuits needed and the number of vertical scanning control circuits needed be M+N. This type of configuration, together with the implementation that the circuits are integrated on the same substrate, provides advantages of decrease in manufacturing cost and improvement in reliability.

It is also possible to construct the projection-type display apparatus of FIG. 5 (third embodiment) by using the liquid crystal panel of FIG. 6 according to this embodiment.

As described above, according to the invention, writing of a second field is started after completion of writing of a first field, while information written in the first field is held (the first and second field constitute one frame). After completion of the writing of the second field, writing of a first field of the next frame is started while information written in the second field is held. By repeating this operation, display with high vertical resolution can be attained.

By applying the above driving method to an integrated liquid crystal panel in which a plurality of active matrix regions are controlled by a common peripheral circuit, it becomes possible to display a high-brightness image having high vertical resolution or three-dimensional image.

What is claimed is:

1. A method for driving an EL display device having a plurality of signal lines in a display portion, comprising:

applying first signals to odd numbered lines of the signal lines to display a first field in a first frame; and applying second signals to even numbered lines of the signal lines to display a second field in the first frame before or after applying the first signals to the odd numbered lines, wherein at least part of a display of the first field overlaps with a part of a display of said second field.

2. A method according to claim 1 wherein the first signals applied are held during the applying the second signals.

3. A method according to claim 1, wherein said EL display device is an active matrix type display device.

4. A method for driving an EL display device having an active matrix type pixel region, comprising:

applying first signals to first plurality of signal lines in the pixel region to display a first field in a first frame;

applying second signals to second plurality of signal lines in the pixel region to display a second field in the first frame; and applying third signals to the first plurality of signal lines to display a first field in a second frame, wherein each of the first plurality of signal lines is next to each of the second plurality of signal lines, wherein the second field in the first frame is started after completion of the applying the first signals while the first signal in the first field is held, and wherein the first field in the second frame is started after completion of the applying the second signals while the second signal in the second field is held.

5. A method according to claim 4, wherein the method further comprises a step of applying fourth signals to the second plurality of signal lines to display a second field in the second frame, the second field in the second frame is started after completion of the applying the third signals and while the third signals are held.

6. A method according to claim 4 wherein said display device is a projector.

7. A method for driving an EL display device having at least first and second plurality of signal lines in a display portion, comprising:

dividing one-frame into two fields;

scanning the first plurality of signal lines to display one of the two divided fields in the one frame; and scanning the second plurality of signal lines to display the other of the two divided fields in the one frame, wherein each of the first plurality of signal lines is next to each of the second plurality of signal lines, and wherein the other of the two divided fields overlaps a displayed duration of the one of the two divided fields.

8. A method according to claim 7, wherein signals applied to the first plurality of signal lines are held during applying signals to the second plurality of signal lines.

9. A method according to claim 7, wherein said EL display device is an active matrix type display device.

10. A method for driving an active matrix type EL display device having at least first and second plurality of signal lines in a panel region, comprising:

dividing signals for an image to be displayed on said panel region into first and second signals;

applying the first signals to the first plurality of signal lines; and applying the second signals to the second plurality of signal lines, wherein each of the first plurality signal lines are next to each of the second plurality signal lines, and wherein the steps of applying first and second signals is performed alternately, and wherein the first signals applied are held during the applying the second signals.

11. A method according to claim 10 wherein said display device is a projector.

12. A method for driving an EL display device comprising:

displaying first and second divided images on a display region of said EL display device, said first and second divided images being synthesized to display one image on the display region, wherein said display region has a plurality of pixels in a matrix form, wherein said first divided image is displayed on odd numbered lines of the pixels and said second divided image is displayed on even numbered lines of the pixels, and wherein the display of the second divided image starts during display of the first divided image.

13. A method according to claim 12 wherein said display device is a projector.

14. An EL display device formed over a substrate comprising:

at least one active matrix panel comprising a plurality of pixels disposed in a matrix form, a plurality of gate lines, a plurality of source lines, a first circuit for forming an image corresponding to a first field of a frame and, a second circuit for forming an image corresponding to a second field of said frame, wherein the formation of the image corresponding to the second field of the frame starts during display of the image corresponding to the first field of the frame.

15. A device according to claim 14 wherein said display device is a projector.

16. A device according to claim 14, wherein said substrate is glass or quartz substrate.

17. A method for driving an EL display device, comprising:

providing a plurality of pixels, a plurality of switching elements for switching said plurality of pixels, and a plurality of gate lines connected with said plurality of switching elements, said method comprising the steps of;

applying first signals to odd numbered gate lines by a first circuits, each of said first circuit connected with each of said odd numbered gate lines; and applying second signals to even numbered gate lines by a second circuits, each of said second circuit connected with each of said even numbered gate lines, wherein each of said odd numbered gate lines is next to each of said even numbered gate lines, and wherein the first signals applied are held during applying the second signals.

18. A method according to claim 17, wherein said EL display device is an active matrix type display device.

19. A method according to claim 17, wherein said first and second circuits are flip-flop circuits.

20. An EL display device comprising:

a plurality of active matrix regions in a matrix form over a substrate, said active matrix regions comprising a plurality of pixels disposed in a matrix form, a plurality of elements for switching said plurality of pixels, and at least first and second gate lines connected with said plurality of elements;

a first plurality of circuits for commonly controlling vertical scanning of said active matrix regions of the odd numbered row;

a second plurality of circuits for commonly controlling vertical scanning of said active matrix regions of the even numbered row;

wherein each of said first plurality of circuits is next to each of said second plurality of circuits, wherein said first and second plurality of circuits are formed over said substrate, and wherein signals applied to the first gate line are held during applying signals to the second gate line.

21. A device according to claim 20, wherein said substrate is glass or quartz substrate.

22. A method for driving a display device having a plurality of pixels and a plurality of gate lines connected with the plurality of pixels, comprising:

obtaining a first field by writing information into the odd numbered gate lines to display the first field; and obtaining a second field by writing information into the even numbered gate lines to display the second field, wherein the first field is displayed until the second field is obtained.

23. A device according to claim 22, wherein said display device is an EL display device.

24. A method for driving a display device having at least a first gate line and a second gate line in a pixel region, comprising;

writing first information into the first gate line to display the first information; and writing second information into the second line of the pixel region to display the second information, wherein the first information is displayed while the second information is written into the second line of the pixel region.

25. A device according to claim 24, wherein said display device is an EL display device.

26. A display device comprising;

a plurality of active matrix regions in a matrix form over a substrate, the active matrix regions comprising a plurality of pixels disposed in a matrix form, a plurality of elements for switching said plurality of pixels, and at least first and second gate lines connected with said plurality of elements;

a first plurality of circuits for commonly controlling horizontal scanning of the active matrix regions of the odd numbered column;

a second plurality of circuits for commonly controlling horizontal scanning of the active matrix regions of the even numbered column;

wherein each of the first plurality of circuits is next to each of said second plurality of circuits, and wherein the first and second plurality of circuits are formed over the substrate.

wherein signals applied to the first gate line are held during applying signals to the second gate line.

27. A device according to claim 26, wherein the substrate is glass or quartz substrate.

28. A device according to claim 26, wherein said display device is an EL display device.

29. A display device comprising:

at least one pixel region over a substrate, the pixel region comprising a plurality of pixels in a matrix form;

a plurality of source lines over the substrate, each of the plurality of source lines connected to one of the pixels;

a plurality of gate lines over said substrate, each of the plurality of gate lines connected to one of the pixels;

a plurality of first flip-flop circuits over the substrate, each of the plurality of first circuits connected to one of the source lines;

a plurality of second flip-flop circuits over the substrate, each of the plurality of second circuits connected to one of the gate lines;

a plurality of selection circuits over the substrate, each of the plurality of selection circuits connected to one of the source lines; and a field discrimination circuit connected to the pixel region, over the substrate, wherein signals applied to odd numbered gate lines of the plurality of gate lines are held during applying signals to even numbered gate lines of the plurality of gate lines.

30. A device according to claim 29 wherein the selection circuit connects to the first and second plurality of flip-flop circuits and alternately selects each of the first and second plurality of flip-flop circuits for applying gate signals.

31. A device according to claim 29, wherein said substrate is glass or quartz substrate.

32. A device according to claim 29, wherein said display device is an EL display device.

* * * * *